3,250,750
ANIONIC POLYMERIZATION OF LACTAMS WITH PYRIDAZINES AS ACTIVATORS

Edward W. Pietrusza, Morris Township, Morris County, N.J., and Rudolph Pinter, Morristown, N.J., assignors to Allied Chemical Corporation, New York, N.Y., a corporation of New York
No Drawing. Filed Apr. 6, 1962, Ser. No. 185,537
10 Claims. (Cl. 260—78)

This invention relates to the preparation of solid, linear polyamides of high molecular weight. More particularly, this invention relates to solid polymers of $\epsilon$-caprolactam of high molecular weight and to a process for the production of said polymers.

Many processes have been proposed in the past for the preparation of solid polymers of lactams containing more than 5 carbon atoms in the lactam ring. These processes have been based either upon the hydrolytic polymerization of said lactams in the presence of various acidic and basic catalysts, or upon the anionic polymerization of these lactams under anhydrous conditions in the presence of an alkali or alkaline earth metal compound as the sole catalytic agent.

A disadvantage of these prior art processes is the necessity of conducting said processes at relatively high temperatures; e.g., for caprolactam, temperatures in excess of the polymer softening point of about 215–225° C. are necessary in order to obtain a satisfactory rate and degree of polymerization. An undesirable feature in the use of such high temperatures is that the degree of polymerization tends to decrease as the temperature of the reaction mixture is increased. It is well known that the polymerizability of $\epsilon$-caprolactam is influenced by a chemical equilibrium between the lactam and the polymer produced therefrom. At temperatures in excess of about 215° C., the presence of appreciable quantities such as about 10% of $\epsilon$-caprolactam is permitted by the equilibrium whereas below said temperatures the formation of poly-$\epsilon$-caprolactam is more highly favored.

Consequently, in order to obtain a polyamide possessing acceptable physical properties by the above process, it is frequently necessary to resort to extensive purification operations in order to remove the undesirable monomeric units present therein.

Furthermore, the molecular weight of the polyamide produced by these prior art processes is relatively low, i.e., the polymeric products exhibited a maximum reduced viscosity in 0.5% m-cresol of about 3.5, which is equivalent to a polyamide possessing a molecular weight of the order of 100,000.

In addition, in those instances wherein it was desirable to transform poly-$\epsilon$-caprolactam into molded shapes, it was usual to heat said lactam to a temperature in excess of its melting point to prepare the desired fabricated shapes by extrusion or injection techniques. The poly-$\epsilon$-caprolactam melt, however, is extremely viscous, transfers heat slowly, and shrinks on cooling; consequently such melt is unsuitable for the preparation of large shaped articles. Moreover the above cited polyamides possess a tendency to discolor in air at the elevated temperatures, about 270° C., commonly employed in said molding operations. Such discoloration or darkening has been attributed to oxidative attack upon the primary amino end groups found in these polyamides.

It has been disclosed in our co-pending U.S. application, Serial No. 146,449, filed October 20, 1961, that the inherent disadvantages of the above described prior art processes are overcome by polymerizing lactams under anionic polymerization conditions, i.e., under base-catalyzed anhydrous conditions wherein a lactam salt of an alkali metal or alkaline earth metal is used as a catalyst, and with employment of specifically an N-(sym. triazino) lactam as cocatalyst. Anionic polymerization conditions are also disclosed in published art, e.g., U.S. Patent 2,739,959 of March 27, 1956 to Ney and Crowther and U.S. Patent 3,017,391 of Jan. 16, 1962 to Mottus, Hedrick and Butler.

We have now discovered that promotion of the anionic polymerization of a lactam results upon providing at least one N-pyridazino lactam, including fused ring pyridazino lactams such as N-phthalazino lactams and N-cinnolino lactams, in the polymerization reaction mixture. Said pyridazino-substituted lactam can be prepared by heating the metal salt of the lactam and a pyridazine which bears on at least one of the carbon atoms of the pyridazine ring, a substituent attached to said carbon atom by a more electronegative atom than the nitrogen atom of the lactam. By metathesis, the metal cation from the lactam salt combines with said substituent, and the lactam residue replaces said substituent. Substituents replaceable by this metathesis include halogen atoms and substituents attached to a carbon atom of the pyridazine ring by an oxygen atom. Illustrative of such replaceable substituents are: chloro, hydroxy, alkoxy, aryloxy, arylalkoxy, cycloalkoxy, mono- and dialkylamino, mono- and diarylamino, mono- and diarylalkylamino, and mono- and dicycloakylamino.

Illustrative examples of pyridazines suitable as starting materials for reaction with lactam salts to form the promoters of our invention are:

3,6-dichloropyridazine
3,6-dibromopyridazine
3-iodo-6-chloropyridazine
3-chloro-6-fluoropyridazine
3,4,6-trichloropyridazine
4,5-dichloropyridazine
3-chloro-6-hexoxypyridazine
3,6-dimethoxypyridazine
3,6-diphenoxypyridazine
3-cyclohexyl-6-bromopyridazine
3-benzyl-6-chloropyridazine
3,6-di(methylamino) pyridazine
3-chloro-6-diisopropylaminopyridazine
3-chloropyridazine
3,6-dihexoxypyridazine
3,6-dibenzyloxypyridazine
3,6-dibenzylaminopyridazine
3-chloro-4-butyl-6-methoxypyridazine
3-chloro-5-methyl-6-decyloxypyridazine
3-chloro-4,5-dibutylpyridazine
4,5-diphenyl-6-chloropyridazine
3,6-dihydroxypyridazine Illustrative examples of cinnolines for use in our invention are:

3-chlorocinnoline
4-bromocinnoline
3-methoxycinnoline
3-phenoxycinnoline
3,4-dichlorocinnoline
3-chloro-5-methylcinnoline
3,4-diphenoxy-6-butylcinnoline
3-dimethylaminocinnoline Phthalazines useful in our invention are illustrated by:

1-chlorophthalazine
1,4-dichlorophthalazine
1,4-dimethoxyphthalazine
1,4-diphenoxyphthalazine
1-bromo-4-methoxy-6,7-diphenylphthalazine The N-pyridazino lactam promoters used in our process are conveniently prepared by heating, in the lactam as diluent, a metal salt of the lactam and a pyridazine which bears on at least one carbon atom of the pyridazine ring a substituent replaceable by metathesis with said lactam salt. Our promoters can also be prepared from lactam salts by heating in a diluent such as benzene, etc. from which the promoter can be isolated if desired.

The metal salt of the lactam will ordinarily be prepared by heating a known catalyst of anionic polymerization of lactam, i.e. alkali or alkaline earth metal or salt-forming compound thereof, with excess lactam. Such reaction with ε-caprolactam is illustrated by Equation 1:

(1)
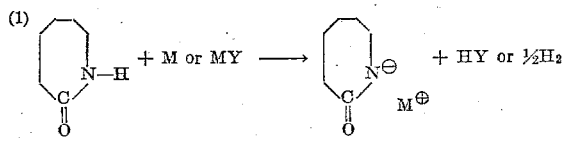

wherein M is an alkali metal such as lithium, sodium, potassium, rubidium, cesium; or alloy thereof; or alkaline earth metal such as calcium and including magnesium; and Y is an anionic species such as hydride, hydroxide, carbonate, amide, oxide, salt of a carboxylic acid, and those carbanions derived from such hydrocarbon species as alkanes, cycloalkanes, arylalkanes and the benzenoids. Illustrative examples of the last-named species of anions are

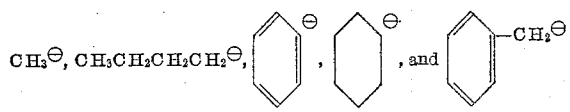

Suitably the salt-forming metal or compound is admixed under anhydrous conditions with the lactam to form a reaction mixture comprising from about 0.1 to about 10, preferably from about 0.3 to about 2 atomic proportions of said metal per 100 molecular proportions of lactam. The temperature of the mixture is brought to a level at which interaction is complete between salt-forming metal or compound and an equivalent quantity of the lactam. Suitable temperatures using, for example, ε-caprolactam are in the range from about 90° C. to about 130° C.

The addition of one of the above pyridazine derivatives to the lactam-lactam salt reaction mixture produced by the process illustrated in Equation 1 results in rapid polymerization of the lactam to form a lactam polymer incorporating said pyridazine. Although we do not wish to be bound by any particular theory, we believe that the addition of one of the above-cited pyridazines to the reaction mixture results in the rapid interaction of said pyridazine with lactam salt in the reaction mixture to form, in situ, an N-pyridazino-lactam, as illustrated for an epsilon-caprolactam salt by Equation 2:

(2)
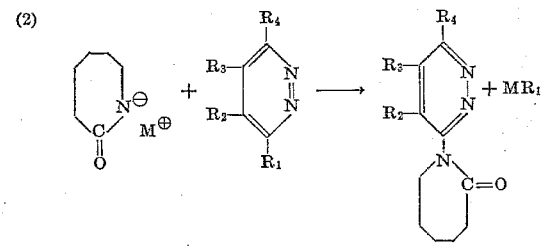

wherein M is a metal and at least one of the R's ($R_1$ in the illustration) is a replaceable substituent as above defined. If more than one of the R's are replaceable substituents, two of these R's (but not two vicinal R's) will in general be replaced on reaction with e.g. caprolactam lithium salt, forming a 3,6-di(caproamido) pyridazine of the formula:

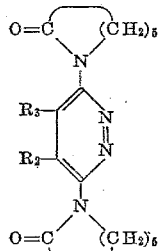

or a 3,5-di(caproamido) pyridazine of the formula:

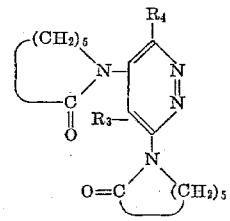

or a mixture of the 3,6- and 3,5-di(caproamido) pyridazines.

The overall process occurring in our polymerization is illustrated by Equation 3 for caprolactam:

(3)
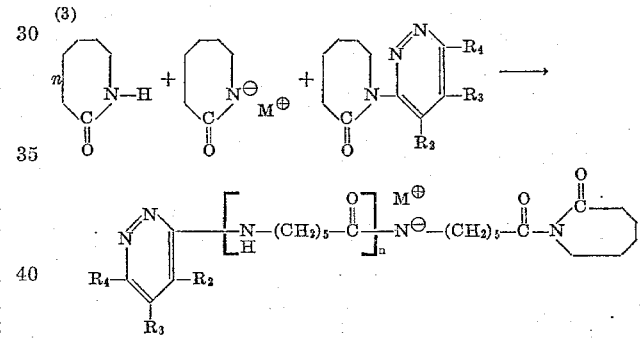

wherein $n$ is an integer from $1 \times 10^3$ to $1 \times 10^4$. The process can be pictured as continuing upon transfer of the metal cation $M^+$ to monomer, forming the metal salt of the lactam from a fresh monomer molecule, with the amido hydrogen from the monomer replacing the metal cation in the polymer.

In those instances wherein the pyridazine employed contains 2, 3 or 4 readily replaceable substituents, polyamides of the following formulas having pyridazine end groups are obtained as the main polymer products:

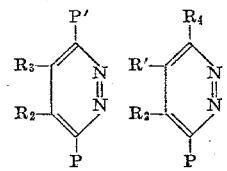

wherein P and P' are polycaproamide chains like that in the product of Equation 3.

Inasmuch as an N-pyridazino-lactam must interact with a metal salt of the lactam to initiate our polymerization process, it is convenient to avoid complete consumption of the available metal salt of lactam for the formation of an N-pyridazino-lactam. Accordingly the ratio of equivalents of metal forming the lactam salt to equivalents of replaceable substituents in the quantity of pyridazine supplied is at least about 1.1:1, preferably 2:1-10:1, and suitably up to about 20:1 or higher. The metal usually employed is an alkali metal and the pyridazino compounds most commonly available have two readily replaceable substituents such as chloro, methoxy or phenoxy; in such instances preferred ratios of atomic proportions of alkali metal:molecular proportions of pyridazine compound supplied are from about 4:1 to about 20:1. At much lower ratios than 4:1 the reaction may be quite slow, and may become uncertain because of impurities reacting with and decomposing the alkali metal salt of the lactam.

The proportion of the dichloro and like pyridazines used, based on lactam, affects the solubility of the polymer product. Relatively large proportions result in a final product at least partially insoluble in meta-cresol. Soluble polymers of reduced viscosity in 0.5% solution in meta-cresol at 25° C. of about 5.5 to 6 can readily be obtained using about 0.05–0.1 mol of 3,6-dichloropyridazine and about 0.4–1 mol of lithium hydride to 100 mols of caprolactam.

The detailed description of our process and the examples which follow set forth the employment of lithium hydride and $\epsilon$-caprolactam in our process; but it is to be understood that these specific compounds and the conditions cited for use therewith are illustrative rather than limiting; and that the same principles and general procedure apply when using other metals or other metal compounds as above defined, and when using other lactams including in particular, 2-pyrrolidone, 2-piperidone, enanthic lactam, omega-caprylic lactam, and their homologs; and using if desired dilactams such as methylene-bis-caprolactam or isopropylidene-bis-caprolactam for introducing cross-linking. Of course it will be found that optimum conditions differ as these substitutions are made.

Polymerization temperatures which can be used in our process range from the melting point of the lactam monomer to the decomposition temperature of the resulting polymer. Temperatures particularly suitable for polymerization of $\epsilon$-caprolactam range from about 140° C. to about 215° C. It has been found convenient to polymerize caprolactam by our process at temperatures below about 200° C., preferably within the range from about 160° C. to about 180° C.

It is necessary that the polymerization process as disclosed herein be conducted under substantially anhydrous, non-acidic conditions. Those compounds which are capable of functioning as proton donors, viz. acids stronger than $\epsilon$-caprolactam, are to be excluded from the reaction mixture, inasmuch as these compounds readily interact with and decompose the metal-organic species in the reaction mixture by replacing the metallic cation moiety of said species with a proton. Furthermore under the process conditions disclosed herein the presence of a proton donating species such as water may function to hydrolyze either the N-pyridazino-$\epsilon$-caprolactam or $\epsilon$-caprolactam to their corresponding omega amino acids. The quantity of water and/or proton donating species should be kept preferably less than about 50 p.p.m.

The polymerization process is preferably conducted by adding a pyridazine to a reaction mixture containing metal salt of caprolactam and $\epsilon$-caprolactam but a reverse procedure can be utilized if desired, i.e. a pyridazine may be added to the caprolactam, and the alkali or alkaline earth metal or salt-forming compound thereof can be added thereafter. Alternatively, if desired, it is possible to add the pyridazine derivative simultaneously with the alkali or alkaline earth metal anionic catalyst to the $\epsilon$-caprolactam.

The metal salt of $\epsilon$-caprolactam is preferably prepared in situ immediately prior to its utilization in the polymerization process, to minimize risk of contamination. However a mixture of said metal salt of caprolactam and $\epsilon$-caprolactam is stable at temperatures of 20–25° C. for a period of at least one month; and even at higher temperatures, e.g. 90° C., the time of stability is about 4 days. Accordingly the salt can be prepared and stored if desired.

The pyridazine derivatives which are employed in our process can readily be prepared by procedures well known in the art. To cite an illustrative example, 3,6-dihydroxy or 3,6-dichloropyridazine can be prepared by the process disclosed in the Journal of the American Chemical Society, vol. 73, page 1873 (1951), wherein 3,6-dihydroxypyridazine is prepared by the interaction of maleic anhydride and hydrazine dihydrochloride. To obtain 3,6-dichloropyridazine, this 3,6-dihydroxypyridazine can be refluxed in the presence of phosphorous oxychloride for a period of 5 hours, producing 3,6-dichloropyridazine in a yield of 81% of theoretical.

By utilization of a pyridazine derivative in conjunction with an alkali or alkaline earth metal catalyst in accordance with our invention, one is able to obtain an extremely high rate of polymerization of $\epsilon$-caprolactam as well as a high degree of conversion to polymer at temperatures considerably below the melting point of poly-$\epsilon$-caprolactam, i.e. at temperatures well below 215° C. At such temperatures the equilibrium is highly favorable toward polycaproamide versus caprolactam monomer. Hence one is able by our process to obtain polymeric products in which about 93% of the monomer has been converted to polymer. Such degree of monomer conversion is highly desirable in that removal of residual monomer from the polymer obtained is unnecessary.

Moreover polycaproamide can be prepared by the process of our invention having reduced viscosity, at 0.5% concentration in meta-cresol and at 25° C., of at least 5, corresponding to molecular weights considerably higher than those usually achieved by the conventional polymerization processes. Such high molecular weight materials possess greater tensile strength and toughness than those of lower molecular weight which have heretofore been prepared especially at elevated temperature such as 210° C. This high temperature stability may be connected with high crystallinity of our polymers (about 40%) and/or with our pyridazino end group terminating 1 or 2 polyamide chains as above discussed in connection with Equation 3.

In addition, the polymerization of relatively fluid monomer to solid polymer in our process allows polymerizing $\epsilon$-caprolactam directly in molds including molds of intricate design by our process, to form solid shaped articles, even articles of large size.

A further advantage is that various filler materials such as sand, pigments, blowing agents, and if desirable, plasticizers can readily be incorporated in the polycaproamide product of our process in a very convenient manner. These materials can be homogeneously admixed with monomeric $\epsilon$-caprolactam, which can then be converted to a filled polycaproamide. Such operations provide uniform distribution of the filler throughout the resulting polymer.

Still another advantage is that the polycaproamides of our invention contain in place of the usual primary amino end groups, pyridazine groups which can be devoid of primary amines as substituents. Such polycaproamides display considerable stability to oxidation as will be evident from the data hereinbelow.

The presence of a pyridazine derivative as an end group permits the inclusion of various substituents into said group which have significant effects upon the physical and/or chemical properties of the polyamide product. Thus, the presence of a chromophoric substituent will result in the formation of a colored polyamide in which the "dye" will be afforded by the pyridazine group and will consequently be part of the molecular structure, and hence non-extractable. The presence of long chain aliphatic groups as substituents in the pyridazine nucleus will confer a degree of lubricity and compatibility with plasticizers, etc. on the polymer. Such lubricity is advantageous in the preparation of molded products, since the polyamide so molded will not tend to adhere to the surface of the mold. Moreover, the presence of such aliphatic groups will impart some degree of hydrophobicity to the polyamide thus making it less susceptible to deformation and hydrolytic attack.

The best mode contemplated by us for carrying out our invention can be set forth as follows:

A metal salt of epsilon-caprolactam, e.g. the lithium salt is prepared in situ as a colloidal solution containing about a 0.02%–0.2% by weight of lithium in dry lactam and is brought to about 90°–100° C. A solution is separately prepared in dry caprolactam of the desired pyridazine, e.g. 3,6-dichloro pyridazine or 3,6-diphenoxy pyridazine, at about 0.02%–1% concentration by weight and is brought to about 190°–200° C.

The two solutions are metered, suitably at equal volumes, into an efficient mixing zone from which the mixture passes rapidly into the mold, heated to about 140°–180° C. All operations are in absence of air, e.g. under a pure, dry nitrogen atmosphere.

The polymer forms rapidly, setting in the mold to a solid. Desirably a supply of polymerization reaction mixture is provided in communication with the mold and under pressure, whereby the mold is kept filled during the polymerization and formation of voids is prevented. After the reaction mixture has solidified, it is cured or annealed under the reaction conditions, suitably for about an hour.

The following examples describe completely specific embodiments of our invention and further illustrate our invention.

EXAMPLES (a) Caprolactam containing less than 50 p.p.m. water was prepared by distilling said caprolactam at 100–115° C. under 3–5 mm. Hg pressure. The dry caprolactam thus obtained was admixed with lithium hydride under anhydrous conditions in proportions of 0.84 mol lithium hydride per 100 mols. caprolactam. The resulting mixture was then heated at 160° C. for a period of 2 hours under a dry nitrogen blanket until evolution of hydrogen ceased, indicating completion of reaction and production of 0.84 mol of lithium salt of caprolactam per 100 mols of caprolactam.

The resulting dispersion was constantly agitated with a mechanical stirrer and 3,6-dichloropyridazine was added thereto in proportion of 0.08 mol per 100 mols of caprolactam. Incipient polymerization of $\epsilon$-caprolactam to a thick gel was visually observable within 10 minutes. A substantial formation of solid poly-$\epsilon$-caprolactam was evident within 55 minutes. The reaction mixture was agitated and warmed at 160° C. for an additional 3 hours.

At the end of the 3 hour period the solid mass was cooled slowly to ambient temperature (about 25° C.), and then ground to 20 mesh particle size. The solid material thus obtained was extracted for 3 hours with 50 volumes of boiling water and then dried at 55° C. under 1 mm. Hg pressure for an additional 24 hours. The polycaproamide thereby obtained melted at 225° C. and had reduced viscosity of 5.7 in 0.5% meta-cresol solution at 25° C. The monomer converted to polymer was 92.6%.

The presence of a pyridazine nucleus in the polyamide thus produced was confirmed by examination of the ultraviolet spectrum of said polyamide. A dilute solution of the polyamide material (0.2400 gram in 50 ml. concentrated $H_2SO_4$ at 25° C.) revealed an absorption maximum at 240 m$\mu$ (millimicrons) substantially the same region wherein pyridazine nuclei are known to absorb (Journal Chem. Phys., volume 19, page 711 (1951)). A sample of the polyamide prepared by conventional anionic polymerization techniques employing LiH as the sole catalytic agent exhibited no absorption bands in this region.

(b, c) Using the procedure of this example except substituting 3,6-diphenoxy- or 3,6-dimethoxypyridazine for the 3,6-dichloropyridazine used as above, solid polycaproamide is obtained having at least one pyridazine end group derived from each of these cocatalysts.

In order to demonstrate the remarkable oxidative stability of the polymers of the present invention, a polymer sample prepared as described in Example $a$ was heated in an air circulating oven at 165° C. for 6 hours. For purposes of comparison, a sample of poly-$\epsilon$-caproamide prepared by anionic polymerization employing lithium hydride as the sole catalytic agent was treated in the same manner. Both samples were originally white or light yellow in color. A comparison of the amount of discoloration obtained is illustrated in Table I wherein the change of color is expressed in terms of Gardner color standard.

Table 1

| Polymer Sample | Discoloration (increase in Gardner color index) |
|---|---|
| Example (a) | 6 |
| LiH Anionic Preparation | 12 |

It is evident from the above table that considerable discoloration to a dark brown material resulted with the sample prepared by lithium hydride anionic polymerization, whereas the polymer sample produced by our process was affected to a considerably lesser degree.

While the above describes the preferred embodiments of our invention, it must be understood that departures may be made therefrom within the scope of the specification and claims.

We claim:

1. In a process for the polymerization of a lactam under anionic polymerization conditions involving base-catalyzed anhydrous conditions wherein a lactam salt of a metal of the group consisting of alkali metals and alkaline earth metals is a catalyst, the improvement which comprises providing in the reaction mixture a pyridazine which bears on at least one of the carbon atoms of the pyridazine ring a substituent attached to said carbon atom by a more electronegative atom than the nitrogen atom of the lactam; maintaining in the reaction mixture a temperature from the melting point of the lactam monomer to the decomposition temperature of the resulting polymer and providing the lactam salt and the pyridazine in ratio at least 1.1:1 of equivalents of metal forming the lactam salt:equivalents of the aforesaid substituents in the pyridazine supplied.

2. An improvement as defined in claim 1, wherein the lactam polymerized is at least one member of the group consisting of 2-pyrrolidone, 2-piperidone, $\epsilon$-caprolactam, enanthic lactam, omega-caprylic lactam.

3. A process for the polymerization of a lactam of the group consisting of 2-pyrrolidone, 2-piperidone, $\epsilon$-caprolactam, enanthic lactam, omega-caprylic lactam which comprises forming a reaction mixture of said lactam with a metal salt of said lactam and a pyridazine which bears on at least one carbon atom of the pyridazine ring, a substituent replaceable by metathesis with said lactam salt, and maintaining said reaction mixture in liquid state at temperatures not above the softening point of the polyamide product which results, until solid polymer is formed in said reaction mixture.

4. A process as defined in claim 3 wherein the replaceable substituent in the pyridazine is at least one member of the group consisting of halogen atoms and substituents attached to the pyridazine ring by an oxygen atom.

5. A process as defined in claim 4 wherein the lactam polymerized is $\epsilon$-caprolactam, the metal salt is an alkali metal salt, the temperature of polymerization is in the range from about 140° C. to about 215° C., and the ratio of atomic proportions of alkali metal in the reaction mixture to equivalents of replaceable substituents in the quantity of pyridazine supplied lies within the range from about 2:1 to about 10:1.

6. A process as defined in claim 5 wherein the alkali metal is lithium and the pyridazine is 3,6-diphenoxypyridazine, and polymerization takes place in a mold.

7. A process as defined in claim 5 wherein the alkali metal is lithium and the pyridazine is 3,6-diphenoxypyridazine.

8. A process as defined in claim 5 wherein the alkali metal is lithium and the pyridazine is 3,6-dimethoxypyridazine.

9. As a new composition of matter 3,6-di(N-poly-ε-caproamido) pyridazine of a melting point about 225° C.

10. A process as defined in claim 3, wherein the lactam polymerized is ε-caprolactam and the pyridazino promoter is at least one member of the group consisting of 3,6-dichloropyridazine, 3,6-diphenoxypyridazine and 3,6-dimethoxypyridazine.

References Cited by the Examiner

UNITED STATES PATENTS

| 2,852,510 | 9/1958 | Hoffmann et al. | 260—239.3 |
| 2,985,649 | 5/1961 | Lombardino et al. | 260—239.3 |
| 3,017,391 | 1/1962 | Mottus et al. | 260—78 |
| 3,017,392 | 1/1962 | Butler et al. | 260—78 |

FOREIGN PATENTS

| 1,229,130 | 3/1960 | France. |

WILLIAM H. SHORT, Primary Examiner.

JOSEPH R. LIBERMAN, LOUISE P. QUAST, Examiners.

H. D. ANDERSON, Assistant Examiner.